(12) United States Patent
Meyer et al.

(10) Patent No.: US 7,507,363 B2
(45) Date of Patent: Mar. 24, 2009

(54) METHODS OF THERMOFORMING NON-SELF-SUPPORTING POLYMERIC FILMS AND ARTICLES MADE THEREFROM

(75) Inventors: Daniel E. Meyer, Lake Elmo, MN (US); Karen J. Calverley, Stillwater, MN (US); Paul S. Engelen, Minneapolis, MN (US); Michael A. Johnson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 228 days.

(21) Appl. No.: 10/491,802

(22) PCT Filed: Dec. 31, 2002

(86) PCT No.: PCT/US02/34989

§ 371 (c)(1),
(2), (4) Date: Apr. 5, 2004

(87) PCT Pub. No.: WO03/037605

PCT Pub. Date: May 8, 2003

(65) Prior Publication Data

US 2004/0234771 A1 Nov. 25, 2004

Related U.S. Application Data

(60) Provisional application No. 60/336,502, filed on Oct. 31, 2001.

(51) Int. Cl.
*B29C 51/00* (2006.01)
*B29C 43/00* (2006.01)
*B29C 71/00* (2006.01)
*B32B 33/00* (2006.01)

(52) U.S. Cl. .......... 264/347; 264/320; 264/500; 264/510; 264/544; 264/547; 264/549; 264/550; 264/554

(58) Field of Classification Search .......... 428/40.1, 428/40.9, 41.2, 41.3, 41.5, 174, 187; 156/230, 156/232, 233, 242, 245, 243; 264/320, 347, 264/500, 510, 544, 547, 549, 550
See application file for complete search history.

(56) References Cited

U.S. PATENT DOCUMENTS 3,470,291 A * 9/1969 Johnson .................. 264/292

(Continued)

FOREIGN PATENT DOCUMENTS

EP 0 045 421 A2 2/1982

(Continued)

OTHER PUBLICATIONS

R. Peterson, *Thermoforming Handbook*, Klockner Pentaplast, May 10, 1996, Revision 2.

(Continued)

*Primary Examiner*—Patricia L Nordmeyer
(74) *Attorney, Agent, or Firm*—Thomas M. Spielbaue (57) ABSTRACT

A thermoforming method and objects prepared using the thermoforming method are described. Non-self-supporting, polymeric films are initially formed into a three-dimensional shaped film on a male mold and then transferred to a female mold while being supported by the male mold. The three-dimensional shaped film can be further thermoformed, reinforced, or a combination thereof on the female mold. The resulting object has a substantially uniform thickness across a major surface. The method can preserve the surface quality of the polymeric film used to prepare the three-dimensional objects.

17 Claims, 4 Drawing Sheets

U.S. PATENT DOCUMENTS

| | | | |
|---|---|---|---|
| 3,654,062 A | 4/1972 | Loew | |
| 4,101,698 A | 7/1978 | Dunning et al. | |
| 4,115,619 A | 9/1978 | Kurfman et al. | |
| 4,496,408 A | 1/1985 | Hahn | |
| 4,906,494 A | 3/1990 | Babinec et al. | |
| 5,081,213 A | 1/1992 | Carlson | |
| 5,196,246 A | 3/1993 | Kauss et al. | |
| 5,290,625 A | 3/1994 | Eisfeller et al. | |
| 5,490,893 A * | 2/1996 | Enlow et al. | 156/230 |
| 5,725,712 A | 3/1998 | Spain et al. | |
| 5,811,053 A | 9/1998 | Ota et al. | |
| 5,840,783 A | 11/1998 | Momchilovich et al. | |
| 5,968,657 A | 10/1999 | Scullin et al. | |
| 6,071,621 A | 6/2000 | Falaas et al. | |
| 6,083,335 A | 7/2000 | Scullin et al. | |
| 6,221,439 B1 * | 4/2001 | Negele et al. | 427/514 |
| 6,287,672 B1 | 9/2001 | Fields et al. | |

FOREIGN PATENT DOCUMENTS

| | | |
|---|---|---|
| EP | 0 392 847 A2 | 10/1990 |
| EP | 0 549 809 A1 | 7/1993 |
| EP | 0 551 526 A1 | 7/1993 |
| EP | 0 587 353 A1 | 3/1994 |
| EP | 0 653 279 A1 | 5/1995 |
| EP | 0 782 908 A2 | 7/1997 |
| EP | 0 978 374 A2 | 2/2000 |
| EP | 1 123 791 A1 | 8/2001 |
| GB | 972 662 | 10/1964 |
| GB | 1 361 538 | 7/1974 |
| GB | 136538 | 7/1974 |
| GB | 1 512 084 | 5/1978 |
| GB | 2 107 636 | 5/1983 |
| JP | 52-12274 | 1/1977 |
| JP | 58-53415 | 3/1983 |
| JP | 3-104621 | 5/1991 |
| JP | 5-169524 | 7/1993 |
| JP | 6-55625 | 3/1994 |
| JP | 11-20017 | 1/1999 |
| WO | WO 88/07416 | 10/1988 |
| WO | WO 01/26879 | 4/2001 |
| WO | WO 03/037648 | 5/2003 |

OTHER PUBLICATIONS

*A Processing Guide for Thermoforming*, Bayer Thermoplastics, Bayer Corporation, 100 Bayer Road, Pittsburgh, PA, copyright 1998.

M. P. Stevens, *Polymer Chemistry An Introduction*, 3$^{rd}$ Edition, Oxford University Press, p. 104 (1999).

Wicks et al., *Organic Coatings: Science and Technology*, vol. 1: Film Formation, Components and Appearance, John Wiley and Sons, p. 38 (1992).

Office Action dated Jul. 11, 2008, received in corresponding Chinese Patent Application No. 02824064.2, filed Oct. 31, 2002 (and translation).

Office Action dated Jul. 15, 2008, received in corresponding Japanese Patent Application No. 2003-539923, filed Oct. 31, 2002 (and translation).

\* cited by examiner

METHODS OF THERMOFORMING NON-SELF-SUPPORTING POLYMERIC FILMS AND ARTICLES MADE THEREFROM

CROSS REFERENCE TO RELATED APPLICATIONS

The present application claims priority to U.S. Provisional Application No. 60/336,502 filed on Oct. 31, 2001, the entire disclosure of which is incorporated by reference herein.

FIELD OF THE INVENTION

The invention provides a thermoforming method and three-dimensional objects prepared using the thermoforming method. In particular, the method involves forming a three-dimensional object from a non-self-supporting polymeric film. The three-dimensional objects are initially formed on a male mold and can have a more uniform thickness across a major surface than objects initially formed on a female mold.

BACKGROUND OF THE INVENTION

Decorative, thermoformable films are widely used to form three-dimensional, decorative accessories and panels that can be attached to a wide variety of industrial and consumer items such as automobiles, trucks, boats, furniture, building materials, appliances, and the like. For instance, metallized polymeric films have been used to fabricate three-dimensional objects that look as if they are made from metal. Substitution of these objects for their metal counterparts can result in at least one of the following: lighter weight, lower manufacturing costs, improved weather resistance, manufacturing ease, greater flexibility, and sharper detail.

In the automotive industry, for example, various components such as trim and bumpers have been prepared for decades from chrome or chrome plated parts to enhance the appearance of automobiles. However, conventional chrome parts have fallen into disfavor in the automotive and other industries because of the cost, lack of flexibility, and manufacturing difficulties associated with such parts. Yet, chrome parts can have a pleasing appearance and can enhance the aesthetic appeal of various products. Thus, there is a demand for a material that looks like chrome, but that lacks the drawbacks associated with chrome and chrome plating.

Thermoformable, metallized polymeric films have been fabricated to simulate chrome. One such film that has been made includes a layer of tin or a tin alloy underneath one or more protective, gloss-enhancing clear coats. Such films have been thermoformed into three-dimensional shaped films that appear to have been made from chrome. For example, U.S. Pat. No. 6,071,621 describes metallized films that can be used to make a wide variety of articles for automotive, furniture, and other uses.

Many different surface effects can be incorporated into a thermoformable film. For example, thermoformable films can also be used to provide surfaces that appear to be painted or colored, to be fluorescent or phosphorescent, or to be mirror-like or retroreflective. The surfaces can also look like wood grain, stone or other ceramic, parchment or other paper, or leather or other textile fabrics. The surfaces can be decorated with one or more graphic images or patterns. WO 88/07416 and U.S. Pat. No. 6,083,335 describe thermoformable films that have surfaces that appear as high gloss painted surfaces for use in the automotive industry.

Thermoformable processes typically involve forming the three-dimensional shaped film on a female mold. The process can be conducted with or without plug assist.

SUMMARY OF THE INVENTION

The invention provides a thermoforming method and objects prepared using the thermoforming method. In particular, the method involves forming three-dimensional objects from non-self-supporting polymeric films. The three-dimensional objects are initially formed on a male mold and can have a more uniform thickness across a major surface than objects initially formed on a female mold (e.g., without plug assist).

One aspect of the invention provides a method of forming a three-dimensional object from a thermoformable and non-self-supporting, polymeric film, forming the polymeric film. The method involves forming the three-dimensional shaped film on a male mold and then transferring the three-dimensional shaped film from the male mold to a female mold. The transfer process involves bringing the male mold, while supporting the three-dimensional shaped film, into registry with the female mold and then separating the male mold from the three-dimensional shaped film. Further forming, reinforcing, or a combination thereof of the three-dimensional shaped film can occur in the female mold.

Another aspect of the invention provides a three-dimensional object. The object includes a non-self-supporting polymeric film formed into a three-dimensional shaped film having a major surface and a minor surface. The thickness across the major surface is substantially uniform and substantially equal to that of the polymeric film used to prepare the three-dimensional object. An average thickness across the minor surface is less than an average thickness across the major surface. The three-dimensional shaped film can be filled with a solid material for reinforcement. The three-dimensional object can also include an attachment system to affix the object to a substrate.

The above summary of the present invention is not intended to describe each disclosed embodiment or every implementation of the present invention. The Figures and the detailed description that follow more particularly exemplify these embodiments.

BRIEF DESCRIPTIONS OF THE DRAWINGS

The invention can be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

DETAILED DESCRIPTION OF THE INVENTION

The invention provides a thermoforming method that can be used to prepare a three-dimensional object from a thermoformable, non-self-supporting polymeric film. A three-dimensional shaped film is initially formed on a male mold and then transferred to a female mold while being supported on the male mold. The three-dimensional object has a more uniform thickness across a major surface than an object initially formed on a female mold. The surface qualities of the polymeric film can be preserved in at least the major surface of the three-dimensional object.

In some applications, it is desirable to thermoform polymeric films into three-dimensional objects that preserve the surface quality of the polymeric film. For example, metallized polymeric films can be thermoformed into various three-dimensional objects useful to the automotive industry for components such as trim or bumpers. The three-dimensional objects are desirably formed without damaging the metallized polymeric film. Surfaces that appear cracked, torn, wrinkled, stress whitened, abraded, nonuniform in color, or the like generally are not acceptable. The formation of such surface defects has, in the past, limited the size and range of three-dimensional objects that can be thermoformed from metallized polymeric films As used herein, "metallized polymeric film" refers to a multilayer film that includes at least one metal-containing layer directly or indirectly adjacent to at least a portion of a polymer layer. In some embodiments, the metal-containing layer is free of polymeric material. For example, the metal-containing layer can contain a continuous layer of metal or alloy bonded to or otherwise deposited on a polymeric layer.

In some conventional thermoforming processes, a three-dimensional object can be prepared by vacuum thermoforming polymeric film (e.g., a decorative film such as a metallized polymeric film) into a female mold cavity. The formed film is then backfilled with a curable fluid (e.g., a polymeric material) that hardens to form a supporting body. When thermoformed within a female mold cavity, the top surfaces of the polymeric film (i.e., those areas of the film that extend over the female mold cavity but that are not in contact with the surface of the female mold cavity prior to forming) tend to be stretched the most. The stretching that occurs when the film is brought into contact with the female mold surface can affect the visual appearance of objects formed from the polymeric films. For example, stretched metallized polymeric films can exhibit stress-whitening, crazing, cracking, a loss in brightness, a loss in gloss, a loss in reflectivity, a loss in color density, or combinations thereof. Such defects can be especially undesirable when the metallized polymeric film is used to provide a decorative article with a desired surface appearance, e.g., a simulated metallic appearance (especially simulated chrome) or the like.

One aspect of the invention provides a method of forming a three-dimensional object from a thermoformable and non-self-supporting, polymeric film. The method involves forming the three-dimensional shaped film on a male mold and then transferring the three-dimensional shaped film from the male mold to a female mold. The transfer process involves bringing the male mold, while supporting the three-dimensional shaped film, into registry with the female mold and then separating the male mold from the three-dimensional shaped film.

As used herein, a "non-self-supporting film" refers to a film that, by itself, fails to sufficiently retain its thermoformed shape when cooled and removed from a mold. The non-self-supporting film typically collapses upon itself. In some embodiments, a film can be deemed to be non-self-supporting if a free edge extending between adjacent corners of a 10 cm×10 cm film sample falls more than about 3 cm below a horizontal position relative to an opposite, supported edge of the sample extending between the remaining two, adjacent corners when such opposite, supported edge of the film is held horizontally and taut at an elongation in the range from 0 to 5 percent at 25° C. In some embodiments, the film sample can fall more than about 5 cm or more than about 10 cm from the horizontal position. Conversely, as used herein, a "self-supporting film" refers to a film that, by itself, can sufficiently retain its thermoformed shape when cooled and removed from a mold.

The polymeric film can be stretched during the thermoforming process. The greatest amount of stretching encountered by the polymeric film typically occurs in less visually significant regions of the three-dimensional object such as along minor surfaces (e.g., side surfaces and edges). The least amount of stretching typically occurs in visually significant regions of the three-dimensional object such as along major surfaces (i.e., major surfaces top surfaces). Consequently, surface characteristics of the polymeric film can be preserved on visually significant surfaces during the thermoforming process.

Because the least amount of stretching typically occurs in the most visually significant regions of the three-dimensional object, the present invention enhances the practical range of materials that can be incorporated into thermoformable, polymeric films, allowing less ductile materials to be used that might otherwise be unsuited to a thermoforming application. In the case of metallized polymeric films that can be readily damaged using conventional thermoforming methods, the thermoforming method of the present invention can expand the range of metals and metal alloys that can be included, and therefore mimicked, in the three-dimensional object.

Additionally, the present invention can enhance the range of contours against which the non-self-supporting polymeric films can be molded without undue degradation of surface properties. For example, to obtain parts with a satisfactory visual appearance, it has been found that a conventional process might be limited to making parts that have a 3:1 width to depth ratio, a draft angle of greater than about 30 degrees, and a depth of no more than about 2 mm. In contrast, the method of the present invention relaxes these restrictions, expanding the range of parts and configurations that can be manufactured from such films. Articles with a pleasing visual appearance can be obtained having smaller width to depth ratios, e.g., 2:1 or 1:1, and draft angles less than about 30 degrees. As used herein, "draft angle" refers to the angle formed by a line parallel to a side surface and a line perpendicular to the top surface (i.e., major surface) of the three-dimensional object.

Increased depths can also be achieved, e.g., of up to about 8 mm or greater, depending upon the size of the article that is formed.

Thermoformable, Non-self-supporting Polymeric Film

The non-self-supporting polymeric films typically have a thickness up to about 100 mils (about 2.54 mm). For example, the film can have a thickness in the range of about 0.5 to about 15 mils (about 0.01 to about 0.38 mm) or about 1 to about 5 mils (about 0.02 to about 0.13 mm). Non-self-supporting polymeric films tend to be more conformable (i.e., more pliable, extensible, and flexible upon application of heat, pressure, and/or vacuum) and tend to exhibit more detail and more sharply defined features after thermoforming compared to thicker film counterparts.

The polymeric film typically possesses sufficient elongation characteristics to be stretched against the contours of a mold surface. The requisite degree of elongation for a film can vary from application to application. In some instances, the films have an elongation up to about 15 percent, up to about 50 percent, up to about 100 percent, up to about 200 percent, up to about 400 percent, or beyond. Generally, it is preferable to use more extensible films for articles having deeper draws. In some instances, the polymeric film has elongations in the range of about 100 percent to about 400 percent. The percent elongation typically is determined at a temperature corresponding to the mold temperature used during the thermoforming process. This temperature can be in the range of room temperature to about 120° C. or in the range of about of about 60° C. to about 85° C. The temperature will vary depending on the composition of the thermoformable polymeric film and can be chosen to be in a range where the polymeric film softens.

The Young's modulus of a polymeric film can be a measure of the film's stiffness and can be indicative of the film's handling characteristics. Young's modulus refers to the longitudinal stress divided by the strain along the loading direction within the elastic regime of a material. Young's modulus can be referred to as the tensile elastic modulus. In the practice of the present invention, the thermoformable polymeric films typically have a Young's Modulus in the range of about 500 psi (about 3 megaPascals) to about 200,000 psi (about 1380 megaPascals. For example, the Young's modulus can be in the range of about 1000 psi to about 100,000 psi (about 6.8 to about 690 megaPascals) or in the range of about 1500 psi to about 50,000 psi (10 to about 345 megaPascals).

The thermoformable, polymeric films can have a single or multilayer construction. The films can be formed from one or more polymers or can be composites of one or more polymers with other materials. Other materials such as, for example, inorganic particles or films, metals, metal alloys, intermetallic compositions, organic materials, conventional additives, or combinations thereof can be included in the polymeric films.

In some embodiments, the polymeric film is a decorative film. The decorative films can have a wide variety of different surface appearances. For example, the surfaces can appear to be painted, to have a wood grain, to have a metallic finish such as a chrome-like finish, to be paper or parchment, to be stone or a ceramic material, to be leather or another textile, to have one or more graphic elements or patterns, to contain alphanumeric information, to be retroreflective or mirror-like, to be fluorescent or phosphorescent, to be pearlescent, to be glossy, matted or otherwise textured, to glitter, or combinations thereof.

Figure 1:
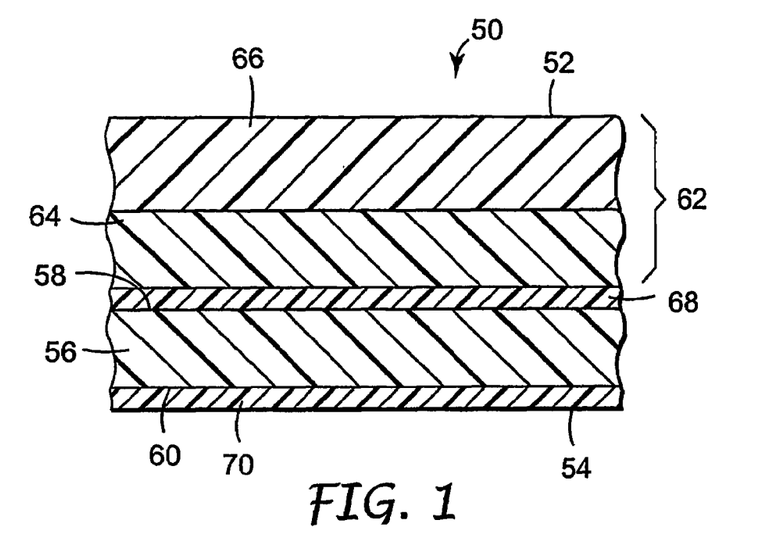
FIG. 1 is a schematic cross-section of one embodiment of a thermoformable film that can be used with the present invention.

FIG. 1 is one embodiment of a thermoformable, polymeric film 50 that can be thermoformed in accordance with the present invention. The thermoformable film 50 has an outer surface 52 and an inner surface 54. The outer surface 52 corresponds to the outer surface of an article formed from the thermoformable film. Similarly, the inner surface 54 corresponds to the inner surface of the article formed from the thermoformable film. The thermoformable film 50 has a multilayer construction and includes a decorative layer 56 with first 58 and second 60 surfaces. An optional first primer layer 68 (also referred to as a tie layer) overlies the first surface 58 of the decorative layer 56. A transparent, protective layer 62 overlies the primer layer 68. The first primer layer 68 not only helps protect the decorative layer to some degree, but also helps adhere the decorative layer 56 to the protective layer 62. A second primer layer 70 can be disposed on the second surface 60 of the decorative layer. The second primer layer 70 can promote adhesion of the decorative layer 56 to other materials such as to an optional reinforcement or backing material (not shown), a substrate, or the like. The various layers of the film can be formed from one or more constituent sublayers. For example, the transparent, protective layer 62 of this representative embodiment includes an inner clear coat layer 64 and an outer clear coat layer 66.

The decorative layer 56 can be included in the thermoformable film 50 to provide an outer surface 52 having a desired visual appearance. The decorative layer 56 is typically at least partially visually discernible through the transparent, protective layer 62. The decorative layer 56 can be continuous or discontinuous.

In some embodiment, the decorative layer 56 is in the form of a metal-containing layer that provides at least a portion of the outer surface 52 of the film 50 with a metallic appearance (i.e., film 50 can be a metallized polymeric film). The metal-containing layers can be formed by a suitable deposition technique such as vapor deposition, sputtering, ion deposition, and the like. Depending upon what kind of metal composition is used, the metal-containing layer can be opaque, highly reflective, and/or can have a polished, mirror-like finish. Metallized polymeric films can be characterized by properties such as optical density. When the metallized polymeric film is opaque, the film 50 typically has an optical density in the range of about 0.9 to about 3.0 as determined on a MacBeth TD 930 densitometer using a yellow filter.

The type of metal(s), alloys and/or intermetallic compositions used to form the metal-containing layer can be selected from a wide range of metal materials. Examples of suitable metal materials include, for example, tin, aluminum, indium, nickel, iron, manganese, vanadium, cobalt, zirconium, gold copper, silver, chromium, zinc, alloys thereof, or combinations of these. Whereas metallized polymeric films that are used with conventional thermoforming methods tend to be limited to the relatively ductile metal compositions, the present invention allows the use of metal-containing layers in the polymeric film that would otherwise be considered too brittle to be included in thermoformable film.

The metal-containing layer typically has a thickness in the range of about 50 Angstroms to about 2500 Angstroms. Sufficient opacity can be achieved if the thickness of the metal containing layer is in the range of about 300 Angstroms to about 1200 Angstroms, or in the range of about 350 Angstroms to about 800 Angstroms. Variations in the thickness can provide differences in the final appearance of the article as desired, e.g. a thicker coating tends to result in a highly polished appearance. In the practice of the invention, the thickness of the metal layer is typically chosen so as to have little effect on the thermoformability of the polymeric film.

The transparent, protective layer 62 overlies the decorative layer 56 and typically includes one or more protective clear coat layers 64 and 66. As used herein, the term "transparent" refers to materials that allow at least some amount of light to pass through the materials. In some embodiments, transparent materials allow greater than 50 percent, greater than 75 percent, greater than 90 percent, greater than 95 percent, or 100 percent of the light to pass through the materials.

The one or more clear coat layers 64 and 66 of the protective layer 62 can be formed from a wide variety of suitable, light transmissive, protective materials that can provide one or more of the following properties: abrasion resistance, high or low gloss as desired, color, high or low reflectivity as desired, weather resistance, resiliency, ultra-violet resistance, protection against oxidation, water resistance, solvent resistance, and/or the like. The clear coat layers 64 and 66 are typically transparent so that the underlying decorative layer 56 is viewable.

A variety of clear coat layers are known and can be used in the practice of the present invention. One example of a suitable clear coat layer includes a thermoplastic fluorinated polymer, such as polyvinylidene fluoride, dispersed in an acrylic resin, such as polymethyl(meth)acrylate or polymethyl(meth)acrylate, as described in U.S. Pat. No. 5,968,657. Other suitable protective layers include polycarbonates and polyurethanes such as those described in U.S. Pat. Nos. 6,071,621, and the like. In some embodiments, the protective layer can be cured to provide an extensible cross-linked film.

The clear coat layer(s) 64 and 66 optionally can include other additives in amounts typically used to achieve a desired end purpose. Such additives include, but are not limited to, antioxidants, UV stabilizers, pigments, plasticizers, gloss control agents, leveling agents, antistatic agents, bactericides, fungicides, fillers, rheology modifiers, combinations of these, and the like.

The inner clear coat layer 64 can be used for a variety of purposes such as enhancing the reflective, mirror-like appearance of the underlying decorative layer, especially when the decorative layer has a metallic appearance. The inner clear coat layer 64 can be formed from a solvent cast polyurethane such as an aliphatic polyurethane. A solvent based coating typically provides a smooth surface on which to deposit the metal-containing layer without interfering with the overall elongation characteristics of the film. A solvent based coating can also help provide resistance to weathering when an aliphatic isocyanate is selected. The inner clear coat layer 64 typically has a thickness in the range of about 5 to about 50 micrometers.

Solvent based polyurethane precursors are commercially available from Bayer Corporation, Pittsburgh, Pa. under the trade designation "DESMOPHEN". Suitable products include, for example, polyester polyols (e.g., product numbers product numbers 631A, 650A, 651A, 670A, 680, 1100, 1150); polyether polyols (e.g. product numbers 550 U, 1600 U, 1900 U, 1950 U); and acrylic polyols (e.g., product numbers A160SN, A375, A450BA/X). The clear coat can be formed from one or more polyols and reacted with an isocyanate to form a polyurethane. Isocyanates are commercially available from Bayer Corp, under the trade designation "MONDUR" and "DESMODUR" such as, for example, DESMODUR XP7100 and DESMODUR 3300.

The outer clear coat layer can be formed from a dispersion that includes aliphatic waterborne polyurethane resins such as those described in U.S. Pat. No. 6,071,621. The outer clear coat layer typically has a thickness in the range of about 0.5 mils to about 3 mils. The outer clear coat provides a protective coating that can exhibit good environmental stability. Commercially available aliphatic waterborne polyurethanes include materials from Avecia (located in Waalwijk in The Netherlands) under the trade designation "NEOREZ" (e.g, NEOREZ XR 9699, XR 9679, and XR 9603) or from Bayer Corp. under the trade designation "BAYHDROL" (e.g., BAYHYDROL 121). The polyurethane compositions typically include small amounts of a cross-linking agent, e.g., less than about 2.5%, such as a diaziridine. An example of a commercially available diaziridine is NEOCRYL CX-100 available from Avecia.

The primer layers 68 and 70 help adhere the decorative layer 56 to other materials such as reinforcement or backing material (not shown), a clear coat layer, a substrate, or the like. Each of the primer layers 68 and 70 typically has a thickness up to about 100 micrometers. In some embodiments, the thickness is in the range of 5 to about 30 micrometers or about 6 to about 13 micrometers. The compositions of the primer layers 68 and 70 typically depend on the type of decorative layer 56 used and the type of materials, if any, to which decorative layer 56 is to be adhered.

In some embodiments, the decorative layer 56 includes a metal-containing layer (e.g., a vapor deposited metal layer of tin or a tin alloy) that can be adhered to a protective layer as well as to polymeric reinforcement (e.g., a polyurethane reinforcement). Primer layers 68 and 70 that can be used with such a decorative layer include, for example, one or more of (1) a polyamide tie materials described in EP 0,392,847 B1; (2) a hydroxy functional polymer such as a hydroxy functional polyurethane or vinyl resin (e.g., VAGH copolymer available from Dow Corp.); (3) a carboxy functional polymer such as VMCH available from Dow Corp.; (4) an amine functional polymer; and/or combinations thereof. Primer layers 68 and 70 can be the same or different composition.

In other embodiments, the primer layers can include a cross-linked adhesive polymer having a semicrystalline region and a polar region. Such adhesive polymers are described in U.S. Patent Provisional Application No. 60/336,449 filed on Oct. 31, 2001, and entitled IRRADIATED PRIMER COMPOSITION AND USE THEREOF IN THERMOFORMABLE FILMS. The cross-linked adhesive polymer typically has a lower tensile strength for the same percent elongation compared to a non-cross-linked counterpart. In particular, the tensile strength of the cross-linked adhesive polymer at maximum percent elongation tends to be reduced compared to a non-cross-linked counterpart. The lower tensile strength typically makes the cross-linked adhesive polymer easier to thermoform.

As used herein, "maximum elongation" refers to a percent elongation that is the lesser of either (i) the elongation at break of the polymer film or (ii) 400% elongation.

As used herein, the term "semicrystalline" refers to materials having regions of crystalline and amorphous character. The term "crystalline" with respect to an adhesive polymer means that the polymer exhibits at least one endothermic peak in a differential scanning calorimeter (DSC) plot. In contrast, an "amorphous" material without any crystalline regions typically exhibits no endothermic peak in a DSC plot.

As used herein, the term "cross-linking" refers to the formation of a bond between one polymer or portion of a polymer to another polymer or portion of a polymer. The adhesive polymers included in the primer layers of the invention are typically cross-linked by formation of a free radical intermediate. Suitable cross-linking methods include, for example, the use of a chemical agent, actinic radiation, or ionizing radiation.

The semicrystalline adhesive polymer can be, for example, a copolymer formed by reacting an olefinic material with a monomer having a polar group. The olefinic portion of the adhesive polymer is typically semicrystalline in nature (i.e., the olefinic portion has both crystalline and amorphous regions). The olefinic material can be formed by free radical polymerization of monomers such as, for example, ethylene, propylene, isobutyl, or combinations thereof. In some embodiments, the olefinic material includes an olefinic monomer having ethylenic unsaturation. For example, the adhesive polymer can be a copolymer formed by reacting a polyethylene oligomer or ethylene monomers with monomers having polar groups. The olefinic portion of the adhesive polymer can be cross-linked. In some embodiments, the adhesive polymer cross-links in an amorphous region of the olefinic portion.

The cross-linkable moiety is typically part of the semicrystalline component of the adhesive polymer. For example, the polymers can cross-link by abstraction of a secondary hydrogen from an olefinic portion of the polymeric backbone. Abstraction of the hydrogen atom results in the formation of a free radical intermediate. The free radical intermediate can combine with other olefinic radicals or additional polymers to form a higher molecular weight polymer.

In some embodiments, electron beam radiation is used to cross-link the adhesive polymer. The radiation dosage is typically less than about 10 Mrads. For example, the dosage can be in the range of about 0.1 to about 10 Mrads or in the range of about 3 to about 7 Mrads. The radiation voltage can typically be up to about 600 kVolts. For example, the voltage can be in the range of about 25 to about 600 kVolts, about 50 to about 300 kVolts, or about 100 to about at about 200 kVolts. Higher voltages can be used to penetrate a greater thickness of the adhesive polymer.

The cross-linked adhesive polymers in the primer layer have a polar region. The polar region includes polar groups that can be directly or indirectly pendant from the polymeric backbone or that can be part of the polymeric backbone itself. In some embodiments, the polar groups are directly or indirectly pendant from the polymer backbone. The polar groups can promote adhesion between the adhesive polymer and a wide range of other materials including, for example, metal-containing compositions, ceramics, and polymeric materials having polar functionality and/or polar chain segments, or combinations of these.

Representative examples of polar groups include acids such as sulfonic, phosphoric, phosphonic, boric, or carboxylic groups, salts based on these acids, esters based on these acids, or combinations thereof. The polar groups can also include amine groups, alkoxy groups, nitrile groups, hydroxy groups, urethane groups, quaternary ammonium groups, heterocyclic moieties such as those described in U.S. Pat. No. 5,081,213, combinations of these, and the like.

In one example, the adhesive polymer includes a copolymer formed by reacting about 80 to about 99 weight percent of an olefinic monomer having ethylenic unsaturation with about 1 to about 20 weight percent of a monomer such as acrylic acid or a salt thereof, (meth)acrylic acid or a salt thereof, or a combination thereof. For example, the adhesive polymer can be formed by reacting about 90 to about 97 weight percent ethylene, and about 3 to about 10 weight percent acrylic acid or (meth)acrylic acid.

Primer layers that include the cross-linked adhesive polymer described in U.S. Provisional Application No. 60/336, 449 can be used in direct contact with a mold surface during the thermoforming process of the present invention. Conventional primer layers typically are not used in direct contact with a mold surface during thermoforming because such primer layers tend to adhere too strongly to the mold, even in the presence of a mold release agent. Removal of the convention primer layer from the mold can result in damaging the thermoformed film. Thus, conventional primers typically are not used for primer layer 70 in FIG. 1 if the primer layer can contact a mold surface.

In addition to having suitable release properties, primer layers containing the cross-linked adhesive polymer can adhere one layer of a multilayered film to another layer or can adhere the polymeric film to another material such as reinforcement material. For example, the primer layers can be used to adhere a metal-containing layer to polymers having polar and/or hydrogen bonding functionality (e.g., polyurethane polymers and the like).

The adhesive polymer can be cross-linked either before or after incorporation into the thermoformable films. For example, the primer layer can be pre-made into a film, such as by extrusion, and then adhered, laminated, or otherwise attached to one or more layers of the thermoformable film. In some embodiments, the primer layer can be irradiated with an electron beam to cross-link the adhesive polymer after incorporation into the thermoformable polymeric film.

The film embodiments of FIG. 1 can be fabricated using any suitable approach. According to one representative approach, a coatable fluid that includes the constituents and/or precursors of the outer clear coat layer 66 is cast or otherwise coated onto a release liner, dried, and/or cured. The inner clear coat layer 64 can be formed over the outer clear coat layer 66 in a similar fashion from a coatable fluid that includes the desired constituents or precursors thereof. Next, the optional primer layer 68 can be disposed on the inner clear coat layer. The primer layer can be formed by coating, lamination, or the like. The decorative layer 56 is then coated, or laminated as the case may be, onto the primer layer. If the decorative layer is metallic, the metal layer preferably is formed using a suitable technique such as, for example, sputtering, vapor deposition, ion beam deposition, or chemical vapor deposition. A second primer layer 70 can be disposed on the decorative layer. The second primer layer can be formed by coating, lamination, or the like.

As shown in FIG. 1, the thermoformable film can contain more than one primer layer. In some embodiments of the thermoformable film of the invention, only one primer layer is used. The primer layer can be, for example, adjacent to a decorative layer. The primer layer can be on either surface of the decorative layer. For example, the primer layer can be used to attach the decorative layer to another layer such as a protective layer. In this example, the primer layer can be interposed between the decorative layer and the protective layer. In another example, the primer layer can be an outer layer of a thermoformable film. The primer layer can be attached, for example, to a surface of a decorative layer that is not visible in the final thermoformed article. A primer layer present as an outer layer of a thermoformable film can be used, for example, to attach reinforcement material to a thermoformed shape.

In some thermoformable films that include a decorative layer, the decorative layer can be disposed between two polymeric layers. Each polymeric layer can include a cross-linked polymer. For example, the decorative layer can be interposed between two cross-linked primer layers or between a cross-linked primer layer and a cross-linked protective layer.

Thermoformable films that include both a decorative layer and a protective layer can have one or more primer layers. For example, the thermoformable film can have a structure arranged in an order such as primer layer-decorative layer-protective layer, decorative layer-primer layer-protective layer, or primer layer-decorative layer-primer layer-protective layer. In some embodiments, the protective layer and the primer layer are both cross-linked.

Other decorative films suitable in the practice of the present invention also have been described in the patent literature. Representative examples of patent documents describing suitable films include U.S. Pat. Nos. 6,071,621 and 5,290,625.

Thermoforming Method and Articles Made Therefrom

Figure 2:
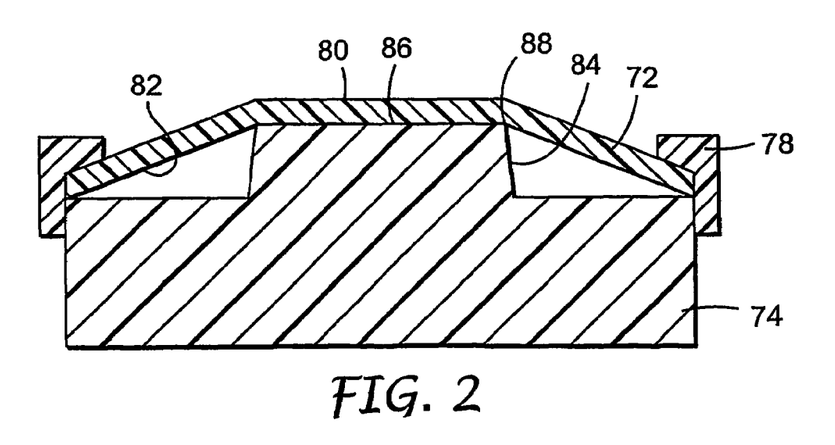
FIG. 2 is a schematic diagram of one embodiment of a thermoformable film positioned in proximity to a male mold.

FIGS. 2 through 8 schematically show one methodology in which a thermoformable, polymeric film can be thermoformed into a three-dimensional shaped film. In FIG. 2, the thermoformable film 72 is provided from a suitable supply (not shown) such as a roll or the like and positioned in operational proximity to a male mold 74. The film 72 is generally supported in a taut state using suitable tooling such as a clamping frame 78. The outer surface of the film 80, corresponding to the visually discernible surface of the object to be formed, is positioned outward relative to the male mold 74. The backside surface 82 of the film is positioned adjacent to the male mold 74 and can contact the major surface 86 of the male mold. The male mold 74 can be held at any suitable temperature (e.g., the temperature can be in the range of room temperature to about 120° C. or in the range of about 60° C. to about 85° C.). Optional heating elements (not shown), e.g., IR heaters, can also be positioned in proximity to the taut film 72 to provide additional heating capability if desired.

The male mold 74 includes one or more male molding surfaces (also referred to in the art as "tables") of the desired shape(s) and contour(s). The number and relative positioning of the one or more male mold surfaces will depend upon factors including the nature of the shape being formed, whether the object to be formed includes one or more discrete constituents, and whether more than one such shape or article is to be thermoformed from the film at the same time. For purposes of clarity, a single male molding surface is shown. The male molding surface(s) can be of varying heights, can have rounded or sharp edges, can be sloped or flat, or can have other contours as desired. As shown, the male molding surface includes one or more sidewalls 84, a major top surface 86, and transition zones 88 in the form of edges between the sidewalls and the top surface. The male mold 74 is shown with the male mold surface facing upward for purposes of illustration. In actual practice, the male mold surface or other molds used in the thermoforming process can be oriented upward, toward a side, or downward as desired.

The top surface 86 can be considered the "major surface" of the mold. As used herein, the major surface of the mold corresponds to a visually discernable portion of the resulting three-dimensional object formed using the thermoforming method of the invention. That is, the major surface (e.g., area 75 in FIGS. 3 to 8) of the three-dimensional object or three-dimensional shaped film is formed from a portion of the film 72 that contacts the male mold (i.e, the portion of the film positioned on the major surface 86 of the male mold 74) prior to the initial forming of the three-dimensional shaped film as shown in FIG. 2.

In contrast, the "minor surfaces" of the male mold corresponds to less visually discernable portions of the resulting three-dimensional shaped film or object formed using the thermoforming method of the invention. That is, the minor surface of the male mold includes the sidewalls 84 as well as the surface of the mold between the sidewalls 84 and the clamp 78. The minor surfaces of the resulting three-dimensional shaped film or three-dimensional object (e.g., area 76 in FIGS. 3-8) are formed from the portion of the film suspended over the minor surfaces of the male mold but not in contact with the male mold as shown in FIG. 2.

The male mold shown in FIG. 2 can be used with thermoformable, polymeric films that do not have a primer layer on the outer surface of the film. Thermoformable, polymeric films having a conventional primer layer as an outer layer tends to aggressively adhere to any mold surface that it contacts. It can be difficult to remove a polymeric film having a conventional primer layer from the mold without tearing the film. The conventional primer can adhere even when the mold surface has been provided with a release agent. Thus, with a polymeric film containing a conventional primer layer as an outer layer, a male mold would not be used to thermoform the film as in FIG. 2 or 3.

In contrast, a primer layer as described in U.S. Provisional Patent Application 60/336,449 can be used as an outer layer of the thermoformable film. Such primer layers have a reduced tendency to stick to a mold surface and can be adjacent to the male mold in the thermoforming method of the present invention. Such primer layers can be used, for example, as tie layer to adhere various materials such as reinforcement materials to the thermoformed film. The primers are especially useful in bonding polymers with polar and/or hydrogen bonding functionality (e.g., polyurethane polymers and the like) to the thermoformable polymeric film.

Figure 3:
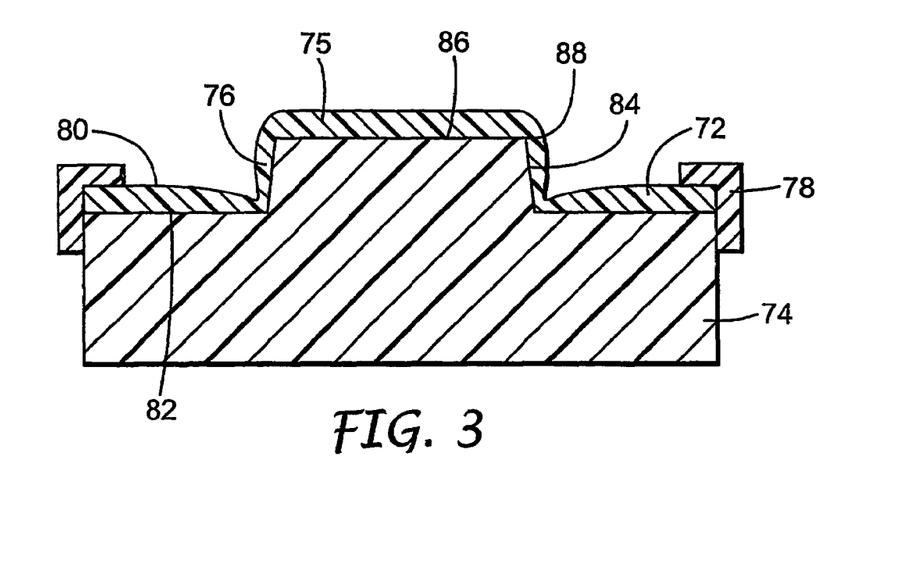
FIG. 3 is a schematic diagram of one embodiment of a thermoformed film positioned against molding surfaces of a male mold.

In FIG. 3, the thermoformable, polymeric film 72 is conformed against the male mold surface using conventional techniques, e.g., under pressure and/or vacuum with moderate heating. This can be accomplished by moving the clamping frame 78, the male mold 74, or both. In some embodiments, film 72 can be brought into contact with the male mold 74 via vacuum. Accordingly, the male mold can be porous and/or can include channels (not shown) to facilitate such vacuum forming. In some embodiments, pressure is avoided to minimize the risk of damaging the outer surface of the film. This initial thermoforming step can be considered to be a pre-forming step. In some embodiments, the three-dimensional shaped film is further stretched upon being transferred to a female mold. In other embodiments, the three-dimensional shaped film is not further stretched upon being transferred to a female mold but is transferred to a female mold to facilitate backfilling with reinforcement material.

The thickness is not uniform across the entire three-dimensional shaped film. The average thickness along the major surface 75 (i.e., the portion of the film in contact with the major surface 86 of the male mold in FIG. 3) is greater than the average thickness along the minor surface 76 (i.e., the portion of the film adjacent to the sidewalls 84 and adjacent to the male mold surface between the sidewalls 84 and the clamp 78 in FIG. 3). The thickness of the film across the major surface 75 adjacent to the major surface 86 of the male mold is substantially uniform and substantially equal to the thickness of the polymeric film before thermoforming.

As used herein, the term "substantially uniform" when referring to thickness, optical density, or other physical characteristic of the major surface of the three-dimensional shape or object means that the thickness, optical density, or other physical characteristic varies less than about 10 percent across the major surface. In some embodiments, the thickness, optical density, or other physical characteristic varies less than about 5 percent or less than 3 percent across the major surface.

As used herein, the term "substantially equal" means the property being compared differ by less than about 10 percent. In some embodiments, the property being compared differ by less than about 5 percent or less than about 3 percent.

The advantages of pre-forming the film 72 on a male mold can be apparent from visual inspection of the three-dimensional film. In a conventional forming process (e.g., in which a film is formed against only a female mold surface), the portions of the film that are subjected to maximum stretch tend to be along the top surfaces of the three-dimensional shaped film or object. As a consequence, such surfaces may tend to stress-whiten, crack, craze, lose brightness, lose gloss, lose reflectivity, lose color density, or the like. In the finished article, these major surfaces tend to be the most visually significant in terms of affecting the overall visual appearance of the article. Loss of visual quality may be undesirable in those embodiments in which a decorative film is being used primarily to provide an article with a desired surface appearance.

In contrast, the method of the present invention protects the more visually significant surfaces (i.e., the major surfaces) to a greater degree. The portions of the film that are subjected to maximum stretch are generally those formed adjacent to the minor surfaces of the male mold. In this way, the visual qualities of the major surface 75 (i.e., adjacent to the major mold surface 86 of the male mold 74) of the three-dimensional shaped film can be substantially preserved. The portions of the film that are subjected to the least amount of stretching are the major surfaces. The practical result is that this thermoforming method tends to shift the visual defects due to stretching to areas of low visual significance.

Although the minor surfaces (e.g., side surfaces and edges) typically experience a greater degree of stretching than the major surface (i.e., top surface), stretching on these minor surfaces can be acceptable because they are less visually significant compared to the major surface in the resultant three-dimensional object. As a consequence, the loss of reflectivity, brightness, color density, haze and the like occur across the minor surfaces rather than across the major surface.

Figure 4:
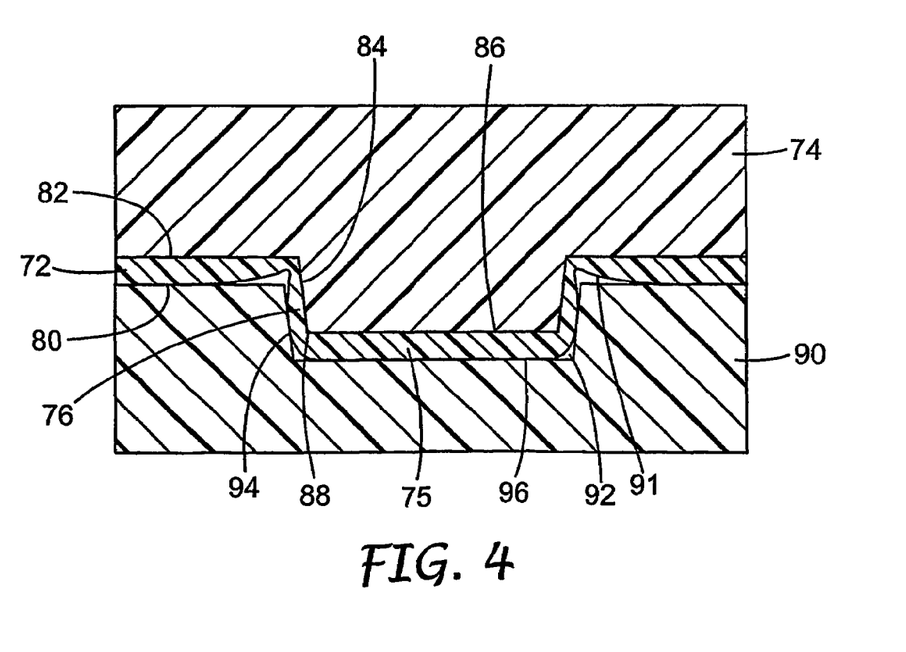
FIG. 4 is a schematic diagram of one embodiment of a male mold and a thermoformed film positioned against a female mold.
Figure 5:
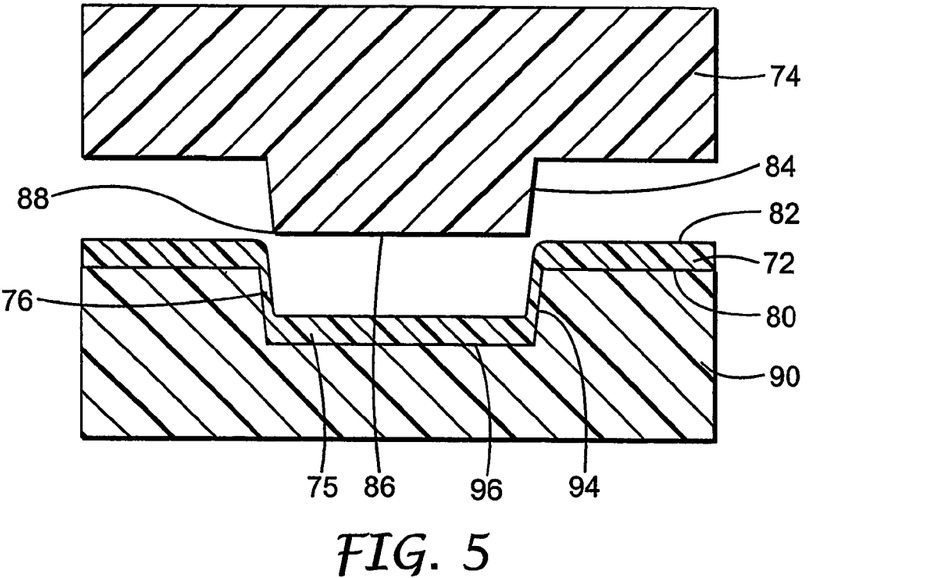
FIG. 5 is a schematic diagram of one embodiment of a thermoformed film positioned in registry with a female mold after transfer from a male mold.

After the film is formed against the male mold 74 into a three-dimensional shaped film, the three-dimensional shaped film 72 is transferred to a female mold 90. The female mold can be held at any suitable temperature (e.g., the temperature is typically in the range of room temperature to about 120° C. or in the range of about 60° C. to about 85° C.). This transfer typically occurs directly from the male mold 74 to the female mold 90 as shown in FIGS. 4 and 5. Using the male mold 74 to provide support for the film 72 during the transfer can avoid the need to use a separate, intermediate supporting member to accomplish the transfer. Any extra transfer steps between tooling components increase the risk of damaging a delicate thermoformable film. Supporting the pre-formed sheet on the male mold 74 during this portion of the transfer preserves the thermoformed configuration of the three-dimensional shaped film and can facilitate the use of flexible, non-supporting films in the practice of the present invention. This direct transfer between the molds is particularly advantageous when the thermoformable film is a decorative, non-self-supporting film. Non-self-supporting films typically do not sufficiently retain the preformed shape when removed from the male mold without adequate support.

In FIG. 4, the male mold 74, which is typically still under vacuum while bearing and supporting the three-dimensional shaped film 72, is engaged in registry with a corresponding female mold 90. In some embodiments, the female mold is heated at about the same temperature as the male mold.

One of the molds can have registration protuberances (e.g., pins) and/or apertures (e.g., holes) that engage corresponding apertures and/or protuberances, respectively, in the other. Generally, the two molds are brought into registry in a manner analogous to the way in which two die halves of a cavity mold would be brought together. The female mold 90 generally includes one or more female mold cavities respectively corresponding to the one or more male mold surfaces on the male mold. For example, as shown in the FIGS. 4 and 5, the female mold 90 has a major surface 96 that corresponds with the major surface 86 of the male mold 74 and sidewalls 94 that correspond with the sidewalls 84 of the male mold 74. The reference to "sidewalls" and "top" refer to the orientation of the cavity walls when the female mold 90 is facing upwards as shown. These same references may be used when mold 90 is in other orientations.

When the two molds are brought together, the male mold surfaces bearing the three-dimensional shaped film fit inside the female mold cavity. The female mold cavity is over-sized relative to the male mold surfaces by at least the thickness of the film 72. The different molds are typically sized to provide enough clearance so that the film is not unduly rubbed, abraded, torn, wrinkled, or otherwise disturbed when the two molds are brought together. That is, the female mold cavity is typically over-sized enough to allow the film 72 to be positioned between the molds without damaging the film 72. The fit of the male mold surfaces and film inside the female mold cavity is close, but not snug.

In some embodiments, the female mold is sufficiently over-sized relative to the male mold such that the outer surface 80 of the film 72 is spaced apart from the walls of the female mold cavity. This distance preferably is not too large or too small. If the distance is too large, the major film surfaces may stretch too much when transferred from the male mold to the female mold. This stretching could unduly detract from the visual appearance of these surfaces. The size of a gap between the molds depends on the size and shape of the objects formed. In some embodiments, the female mold can be sized to provide a gap up to about 1 mm. In some embodiments, the gap is less than about 0.5 mm, less than about 0.3 mm, or less than about 0.22 mm.

Once the female and male molds are positioned together, the pre-formed sheet 72 is transferred from the supporting male mold 74 directly to the female mold 90 as shown in FIG. 5. This can be accomplished using any suitable technique such as pressure applied through the male mold and/or a vacuum through the female mold 90. In some embodiments, the use of a vacuum through the female mold can minimize the risk of damaging the outer surface of the film. The female mold 90 can be porous and/or include channels (not shown) to facilitate such vacuum transfer if a primer layer is an outer layer of the thermoformable film. For example, after the molds are in registry, the vacuum on the male mold 74 can be released and the vacuum can be established on the female mold so that the female mold will support the film 72 while the male mold is withdrawn from the female mold, as shown in FIG. 5. The surface 82 that was adjacent to the male mold surface is now exposed and the surface 80 that was exposed when attached to the male mold is now adjacent to the female mold.

In some embodiments, when the film 72 is transferred to the female mold 90, the film 72 can be subjected to additional thermoforming so as to conform to the female molding surfaces. Thus, some additional, but minor stretching of the film can occur as a consequence of the additional thermoforming.

The degree of stretching along the major surface 75 areas of the formed sheet is reduced compared to a process in which a similar shape is formed directly on the female mold without pre-forming on the male mold. For example, when a three-dimensional shaped film is formed on a female mold without plug assist, the average thickness variation of the film along a major surface can be about 22 percent. The thickness in the major surface is typically less than that of the film prior to thermoforming. In contrast, when using the method of the present invention, the average thickness variation along the major surface has been observed to be only about 2 percent. This ten-fold improvement indicates that the original thickness dimensions of the film are preserved to a much greater extent in the practice of the present invention. Because thickness reduction directly correlates to losses of brightness, color density, reflectivity, and other important visually observable properties of a film, it can be appreciated that films formed in accordance with the present invention retain much higher levels of such qualities.

The articles prepared using the above thermoforming process can also differ from articles prepared using plug assist methods. Plug-assisted thermoforming methods use a plug or plunger to push a clamped, heated film into a mold, which tends to cause substantial, uniform stretching of the film over all the surfaces. With plug assist methods, the overall thickness tends to be fairly uniform across the entire thermoformed shape. The thickness along the major surface is substantially equal to the thickness along the minor surface and substantially equal to the thickness in a transition region between the major and minor surface. However, the thickness is typically less than the thickness of the film used to prepare the three-dimensional object. In contrast, the method of the present invention produces shapes having a uniform thickness on a major surface but with thinner sections in areas where the film is stretched to conform to the mold, as shown in FIGS. 3 to 8. Another distinguishing feature is that the thickness of the film in the major surface of the three-dimensional object is about the same as the thickness of the film prior to thermoforming.

The thickness of the three-dimensional shape correlates with the strain the polymer film experiences during the thermoforming process. The average strain across the minor surface can be greater than the average strain across the major surfaces. When the thermoformable film is a metallic polymeric film, the optical density can also correlate with the thickness of the three-dimensional shaped film. The average optical density can be greater across the major surfaces than across the minor surfaces. The optical density across the major surface can be substantially uniform and can be substantially equal to the optical density of the polymeric film used to prepare the three-dimensional shaped film.

The thermoformed film can be reinforced before removal from the female mold. The type of reinforcement and the methodology used to provide the reinforcement will depend upon the nature of the shape being formed.

Figure 6:
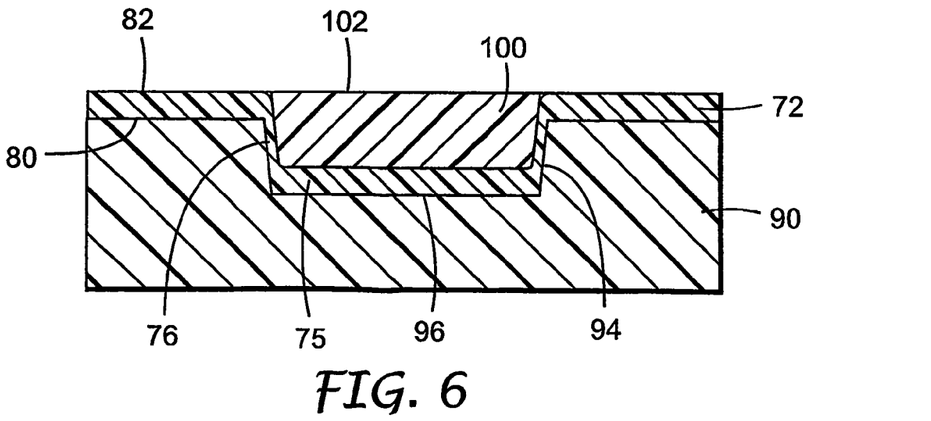
FIG. 6 is a schematic diagram of one embodiment of a thermoformed film positioned against a female mold and backfilled for reinforcement.

FIG. 6 shows one embodiment of a reinforced thermoformed shape. Thermoformed film 72 can be backfilled with a curable fluid 100 while being supported in the female mold 90 to preserve the formed shape of the film. Backfilling can be accomplished using any suitable technique such as by injection molding, extruding, casting, or the like. U.S. Pat. No. 6,083,335, for example, describes a methodology in which injection molding is used to accomplish backfilling. However, because undue mold pressure can damage the visual appearance of the thermoformed film, a suitably low pressure is typically used for backfilling in those embodiments in which visual appearance is important. In such embodiments, the use of injection molding or extruding are typically avoided as these methods involve heat and pressure that could affect the surface appearance of the film. Casting techniques can be used to reinforce the thermoformed shapes to minimize damage to the film. After filling the cavity, the fluid is allowed or caused to harden into a body that will help support the formed sheet when removed from the mold. The primer layer helps adhere the film to the resultant reinforcing body.

The nature of the backfilling fluid can vary depending upon the desired properties of the resultant object. If the object is to be conformable to nonplanar surfaces, the fluid desirably cures to form an elastomeric or plastically deformable material. For example, in the representative context in which the object is a nameplate for a vehicle, the same nameplate can be fabricated and then used on multiple types of cars whose panels have different curvatures. Distinct nameplates specially designed for individual vehicles are not required. If the object is to be attached to planar surfaces or serve a structural support function, fluids that cure to form stiffer, nonflexible bodies may be more desirable.

Typical fluids used for backfilling reinforcement generally include one or more polymers and/or polymer precursors. Representative examples of the polymers and/or resultant polymers, as the case may be, include one or more epoxies, polyurethanes, polyimides, polyamides, polysilicones, fluoropolymers, polyesters, polyethylenes, poly(meth)acrylates, copolymers of these, and the like. In some embodiments, polyurethane polymers, or materials that form such polymers, are used. The backfilling materials can be thermoplastic or thermosetting. Thermosetting materials that cure at temperatures below the thermoforming temperature are typically used for decorative films to avoid damaging the appearance of the film. Thermosetting polymers and/or precursors can include one or more kinds of curing/cross-linking functionality such as chemically cross-linkable functionality (e.g., the urethane linkage formed when hydroxyl functionality cross-links in the presence of polyfunctional isocyanate cross-linking agents), energy-induced cross-linking functionality (e.g., pendant (meth)acrylate or epoxy groups that cure via cationic or free radical mechanisms), combinations of these, and the like. In some embodiments, the reinforcement materials can be cured at a temperature no higher than the temperature used to thermoform the film into a three-dimensional shaped film.

A variety of fluids suitable for use in backfilling are known and/or commercially available. Representative materials suitable for use as backfill reinforcement have been described, for example, in EP 392,847 B1; U.S. Pat. Nos. 6,071,621; 5,968,657; 4,115,619; WO 88/07416; and the like. In some embodiments, the fluid is polyurethane that is tailored to have the desired flexibility characteristics and to at about or below the temperature used for thermoforming.

Figure 7:
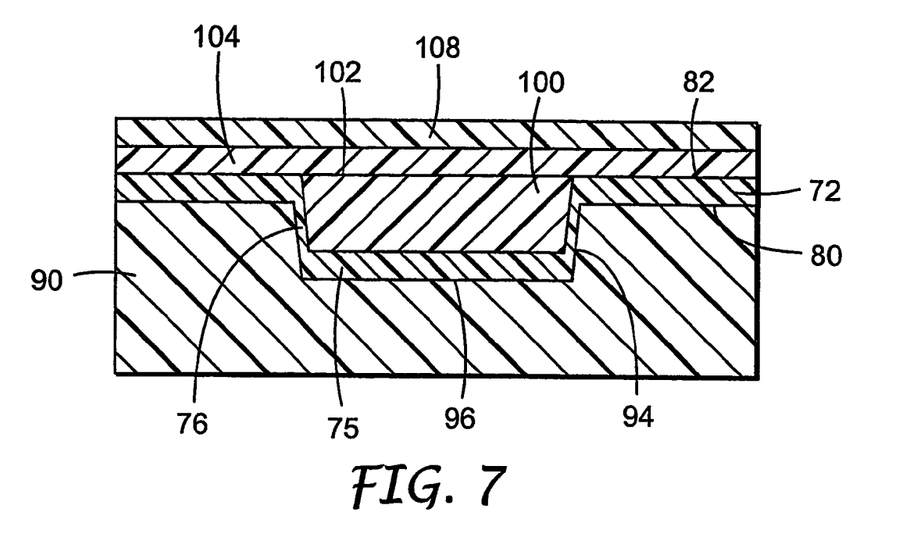
FIG. 7 is a schematic diagram of one embodiment of an adhesive coating and release liner provided over a backfilled, reinforced thermoformed film.

The mounting surface 102 of the resultant object optionally can be provided with an attachment system. In some embodiments, the attachment system includes a pressure sensitive adhesive that allows the resultant object to be adhered and/or fastened to a desired substrate. This can be accomplished in a variety of ways. Under one approach, as shown in FIG. 7, a fluid composition that includes a pressure sensitive adhesive, or precursor thereof, can be coated onto the mounting surface 102 and then dried or otherwise cured to provide a layer of the pressure sensitive adhesive 104. The exposed adhesive surface can be protected with a suitable release liner 108 until used. As an option, a primer and/or tie layer or treatment (not shown) can be interposed between the mounting surface 102 and the adhesive layer 104 to enhance adhesion to the mounting surface.

Figure 8:
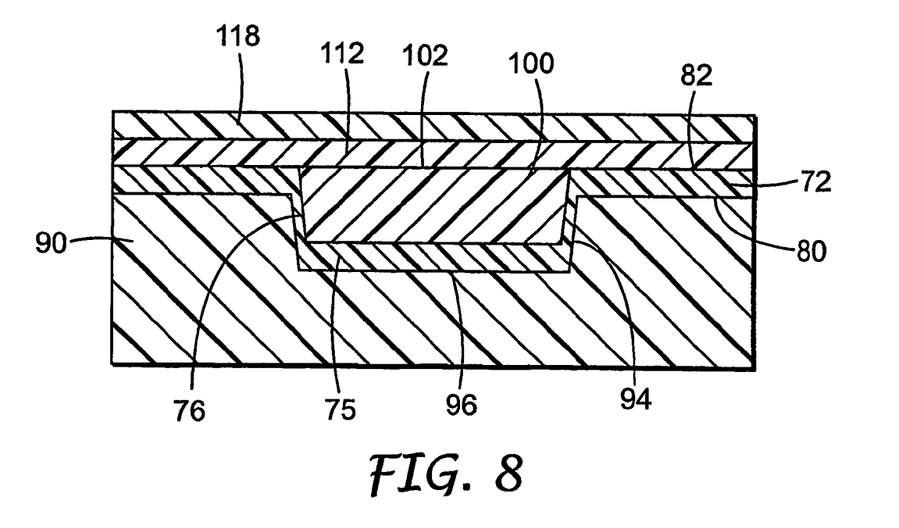
FIG. 8 is a schematic diagram of one embodiment of an adhesive foam tape and a release liner provided over a backfilled, reinforced thermoformed film.

An alternative approach for providing the mounting surface with an attachment system is shown in FIG. 8. A double sided, adhesive foam tape 112 can be applied onto the mounting surface 102. A release liner 118 protects the outer adhesive surface. The release liner can be removed when desired to expose the adhesive surface, allowing the object to be adhered to the desired substrate. One embodiment of a double-sided, adhesive tape useful in the practice of the present invention is a double-sided foam tape commercially available from Minnesota Mining and Manufacturing Company (3M), St. Paul, Minn.

The double-sided tape can be adhered to the molded object before or after the object is removed from the female mold. If applied before, then it is also an option to apply the tape either before or after the backfill fluid in the cavity hardens. It is often more convenient and/or desirable to apply the tape to the object while it is still in the female mold. This is more convenient, for instance, when many separate objects in a relatively large sheet are molded at one time and will be subsequently separated from the sheet and further processed via trimming, laser cutting, die cutting, or the like. Processing before the fluid hardens can help planarize the backfill fluid in the one or more cavities of the female mold.

Still referring to FIG. 8, an optional primer or tie layer (not shown) can be used to enhance bonding of the tape to the body. This can be formed on all or a portion of the mounting surface 102 before the tape 112 is applied. This optional primer layer can be formulated from any conventional primer or the cross-linked adhesive polymer described in U.S. Provisional Patent Application No. 60/336,449. The resultant structure can then be removed from the mold and then stored, cut, trimmed, further processed, combined with other parts, or otherwise used as desired in accordance with conventional practices.

In FIGS. 2 through 8, the male and female molds, or at least the shaping surfaces of these molds, typically include materials that exhibit release characteristics that allow the resultant formed film to be removed from the mold. In some cases, a suitable material, such as a fluoropolymer, silicone polymer, or the like can be integrally incorporated into the mold. Alternatively, one or more conventional mold release agents can be coated onto the mold from time to time as needed.

Another embodiment of a thermoforming operation of the present invention includes the use of a thermoforming tool having a male mold and a female mold movably coupled together at a juncture. Both molds can be porous so that a vacuum can be established through the molds. The juncture can be formed from any suitable structure that allows the tool to be movably opened and closed. One or more hinges have been found to be suitable for providing this juncture. A thermoformable film is held in a taut position over the male mold by a suitable structure for securing the film such as clamps or tape. The film is formed against the heated male mold by pulling a vacuum through the male mold. The clamps can be removed after forming the three-dimensional shaped film.

The male mold, and/or the female mold if desired, can be pivoted about the juncture hinge in order to close the two molds. Like the male mold, the female mold can be heated to a suitable temperature. One or more registration structures such as, for example, a pin and aperture can be respectively positioned on each of the molds to help ensure that the two molds are properly registered when closed.

The female mold cavity can be sized to fit the male mold and the three-dimensional shaped film snuggly or can be oversized relative to the male mold plus the film. For example, there can be a small gap between the major surface of the female mold and the major surface of the film supported on the male mold. The vacuum on the male mold can be released while a vacuum through the female mold is established. As a consequence, the film can be directly transferred from the male mold to the female mold. In some embodiments, the three-dimensional shaped film can be further formed (e.g., thermoformed) on the female mold.

The molds are then opened. A backfilling resin can be cast into the cavity formed by the thermoformed film and allowed and/or caused to cure to reinforce the film. The reinforcement may be rigid or flexible. A fabricated article that includes the film and the reinforcing material can be formed.

A double-sided adhesive tape can be applied over the fabricated article supported in the female mold. A release liner can be used to protect the exposed surface of the tape. An optional priming treatment or primer layer can be used to help secure the tape to the fabricated article. The fabricated article can then be removed from the female mold and die cut along predetermined desirable die cut lines to produce individual parts. In use, the release liner on the underside of a part can be removed, allowing the part to be easily adhered to a desired substrate.

The present invention will now be described with reference to the following illustrative examples.

EXAMPLES

Examples 1-4

Films were prepared by mixing the various polyurethane dispersions shown in Table 1 with about 1 weight percent cross-linking agent (NEOCRYL CX-100) based on the total solids content of the urethane dispersion, and about 10 weight percent butyl carbitol solvent. The compositions were coated onto a release coated polyester film using conventional means such as a roll coater, to form a dried film thickness of about 1 mil. The coated films were dried for 2 minutes at 93° C., then for 3 minutes at 140° C.

A solvent based polyol composition was formed by mixing about 10 parts of DESMOPHEN 651A65, 25 parts of DESMOPHEN 670-80, 1 part of cellulose acetate butyrate, and 58 parts of a 50/50 solvent blend of DOWANOL PM acetate and methyl isobutyl ketone (parts were based on weight). The composition was stirred to mix well. To the composition was added 500 parts per million of dibutyl tin dilaurate catalyst and sufficient isocyanate (DESMODUR Z4470) to obtain an isocyanate to hydroxyl ratio between about 0.8 and 1.2. The composition was then coated onto each of the dried first films using conventional means to form a dried thickness of about 1 mil. The films were then dried and cured using a suitable temperature profile such as for about 1.5 minutes at 150° F. (66° C.), about 1.5 minutes at 200° F. (93° C.) and about 1.5 minutes for about 300° F. (149° C.).

The film with the coatings was then vapor coated with tin to an optical density between about 0.9 and 3. Then a 1 mil thick layer of ethylene acrylic acid (EAA is commercially available PRIMACOR 3330 from Dow Chemical Company, which has 6.5% acrylic acid and 93.5% ethylene), supported on (e.g., hot melt coated or extruded onto) a polyester release film, was electron beam irradiated at 5 Mrads and 175 kVolts and then laminated to the tin coating using a heated nip. This nip was heated to about 210° F. (99° C.). The release films were removed.

In thermoforming the film, a male mold was prepared having the letter "O" in relief. The letter had an overall size of 42 mm by 40 mm and a maximum depth of 7 mm. The width encompassed by the outside edge of the "O" and the inside edge of the "O" was about 8 mm, and the draft angle was about 8 degrees. The film was thermoformed on the male mold by taping the film with the EAA side against the mold. The film was heated using a hot air blower and the mold was heated to a temperature of about 160° F. (71° C.). A vacuum of about 26 inches (66 cm) of mercury was used to form the film after heating. After forming, the male mold bearing the formed film was placed into a corresponding female mold, heated to 160° F. (71° C.) and further formed using vacuum at about 26 inches (66 cm) of mercury. After the second forming, the thickness of the film was measured. The original film had a thickness of about 4.4 mils (0.17 mm). At the top surface (i.e., major surface) between the inside edge and outside edge of the "O", the thickness was 4.2 mils (0.17 mm) using the thermoforming method of the invention. The top surface (i.e., major surface) exhibited no thinning of the metal layer. Another sample of the same film was formed only in the female mold. The thickness in the corresponding top portion was 2.8 mils (0.11 mm), and noticeable thinning of the metal layer was observed.

After the female thermoforming, the molds were filled with a polyurethane reinforcing layer provided by pouring into the vacuum formed film a mixture containing equal equivalents of LEXOREZ 5901-300 polysalt polyol (available from Inolex Chemical Co.), about 500 parts per million dibutyl tin dilaurate catalyst, and DESMODUR N-100 polyisocyanate (available from Bayer Corp.). The mixture flowed into the cavities if the film was supported by the female mold. The heat from the mold was sufficient to cause the mixture to cure.

A film such as a polyamide film (MACROMELT 6240) could be applied to the uncured urethane to promote adhesion between an adhesive tape and the urethane. A pressure sensitive tape, such as a foam tape as described in EP 392847 A2, can be attached to the polyamide film. A release liner can be attached to the tape to protect it from dirt, or other contamination. The article can be then removed from the female mold, cooled, and further processed, for example die cut.

TABLE 1

Polyurethane layer combined with primer layer

| Example | Polyurethane dispersion |
|---|---|
| 1 | BAYHYDROL 110 |
| 2 | BAYHYDROL 121 |
| 3 | NEOREZ XR 9699 |
| 4 | NEOREZ XR 9603 |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A three-dimensional object comprising
   (a) a three-dimensional shaped film formed by a process comprising:
      providing a thermoformable, non-self-supporting, polymeric film;
      forming the polymeric film into a three-dimensional shaped film on a male mold, wherein an outermost surface of the polymeric film is exposed during said forming;
      transferring the three-dimensional shaped film from the male mold to a female mold, said transferring comprising:
         supporting the three-dimensional shaped film with the male mold,
         bringing the male mold into registry with the female mold, and
         separating the male mold from the three-dimensional shaped film; and
      withdrawing the male mold from the female mold; and
   (b) a cured hardenable material filling space previously occupied by the withdrawn male mold.

2. The three-dimensional object of claim 1, wherein the polymeric film is a multilayer film comprising a metal-containing layer.

3. The three-dimensional object of claim 1, wherein said forming comprises thermoforming at least a portion of the polymeric film against a surface of the male mold.

4. The three-dimensional object of claim 1, wherein said hardenable material comprises a chemical catalyst.

5. The three-dimensional object of claim 1, wherein said hardenable material is curable by a curing dosage of energy.

6. The three-dimensional object of claim 1, further comprising an attachment system on a mounting surface of the three-dimensional object for attaching the three-dimensional object to a substrate.

7. A method of forming a three-dimensional object, said method comprising:
   providing a thermoformable, non-self-supporting, polymeric film;
   forming the polymeric film into a three-dimensional shaped film on a male mold, wherein an outermost surface of the polymeric film is exposed during said forming;
   transferring the three-dimensional shaped film from the male mold to a female mold, said transferring comprising:
      supporting the three-dimensional shaped film with the male mold,
      bringing the male mold into registry with the female mold, and
      separating the male mold from the three-dimensional shaped film;
   withdrawing the male mold from the female mold; and
   reinforcing the three-dimensional shaped film after withdrawal of the male mold from the female mold and while the film is in contact with the female mold wherein said reinforcing comprises filling at least a portion of the three-dimensional shaped film with a hardenable material so as to fill space previously occupied by the withdrawn male mold, and hardening the hardenable material.

8. The method of claim 7, wherein the polymeric film is a multilayer film comprising a metal-containing layer.

9. The method of claim 8, wherein the metal-containing layer comprises a continuous layer of metallic material.

10. The method of claim 7, wherein the female mold is oversized relative to the male mold and the three-dimensional shaped film and wherein a portion of the three-dimensional shaped film is stretched during said transferring.

11. The method of claim 7, wherein said forming comprises thermoforming at least a portion of the polymeric film against a surface of the male mold.

12. The method of claim 7, further comprising thermoforming the three-dimensional shaped film in the female mold.

13. The method of claim 7, wherein said reinforcing occurs at a temperature no greater than a temperature used for forming the three-dimensional shaped film.

14. The method of claim 7, wherein said hardening comprises curing the hardenable material with a chemical catalyst.

15. The method of claim 7, wherein said hardening comprises exposing the hardenable material to a curing dosage of energy.

16. The method of claim 7, wherein said transferring comprises pulling the three-dimensional shaped film from a surface of the male mold into the female mold using a vacuum.

17. The method of claim 7, further comprising:
   providing an attachment system on a mounting surface of the three-dimensional object for attaching the three-dimensional object to a substrate.

* * * * *